Feb. 2, 1960 W. F. NIELSEN 2,923,588

RANDOM PULSE GENERATOR PRODUCING FIDUCIAL MARKS

Filed Dec. 2, 1957 2 Sheets-Sheet 1

INVENTOR.
WILLIAM F. NIELSEN
BY
Harry M. Saragovitz
ATTORNEY

INVENTOR.
WILLIAM F. NIELSEN
BY
Harry M. Saragovitz
ATTORNEY

United States Patent Office 2,923,588

Patented Feb. 2, 1960

2,923,588

RANDOM PULSE GENERATOR PRODUCING FIDUCIAL MARKS

William F. Nielsen, Albuquerque, N. Mex., assignor, by mesne assignments, to the United States of America as represented by the United States Atomic Energy Commission Application December 2, 1957, Serial No. 700,241

2 Claims. (Cl. 342—23)

The invention relates to an apparatus for automatically applying a fiducial marking having a pattern, which is non-repetitive, to a plurality of simultaneously made records.

When a plurality of separate recordings are made of several variables in an observed phenomenon, it is desired that the recordings also include a fiducial recording that will permit the separate recordings to be later related in a time wise sense, whereby the recordings may be interpreted. It is possible to manually impress fiducial markings by the manipulation of mechanical or electrical means. However, it has been found that when fiducial markings are made in this manner they tend to have patterns which are repetitive in character. The repetitive character of a pattern would open the way for possible errors in matching the recordings and would lead to errors in the interpretation of the recordings.

The apparatus according to the present invention includes means for producing a signal that assures the randomness of a pattern. The signal is applied to a pulse generator wherein the randomness in a pattern appears in the duration and the spacing between pulses. The apparatus includes a noise generator that generates a signal having a frequency spectrum extending from pure D.C. to the megacycle range of frequencies.

The output of the noise generator is amplified and applied to the input of a band pass filter, whereby a certain band of frequencies from a desired portion of the spectrum may be passed. When the signal is thus reduced to a certain narrower band of frequencies, the signal suffers a reduction in amplitude. To obtain a signal of the requisite amplitude, the output of the filter is amplified in one or more stages of amplification.

The output from the amplifier is applied to the grid of a first of a pair of triodes forming a trigger circuit. When the potential is positive going and attains the predetermined amplitude the trigger circuit is triggered from an initial stable condition into a second stable condition. A subsequent negative going potential at the output of the amplifier is required to trigger the trigger circuit back into its initial stable condition.

The output from the trigger circuit is utilized to control the output of a pulse generator, the pulse output being initiated at the instant that the trigger circuit is triggered into its second stable condition and terminated when the trigger circuit is again triggered into its initial stable condition.

The output of the pulse generator may be used directly for performing the desired operations or may alternatively be used to control the actuations of a relay, whereby a larger current flow may be controlled. The preferred apparatus includes two pulse generators controlled from the same trigger circuit providing for the optional utilization of the apparatus.

It is an object of the invention to provide an apparatus that will automatically produce identical fiducial markings on each of a plurality of records, said fiducial markings being non-repetitive in character.

Another object of the invention is to provide an apparatus for producing a continuous series of pulses, the pulses having random length and spacing and forming a pattern which is non-repetitive in character.

Other objects of the invention will be obvious from a consideration of the specification and claims taken with the disclosure of the accompanying drawings in which:

Figure 1:
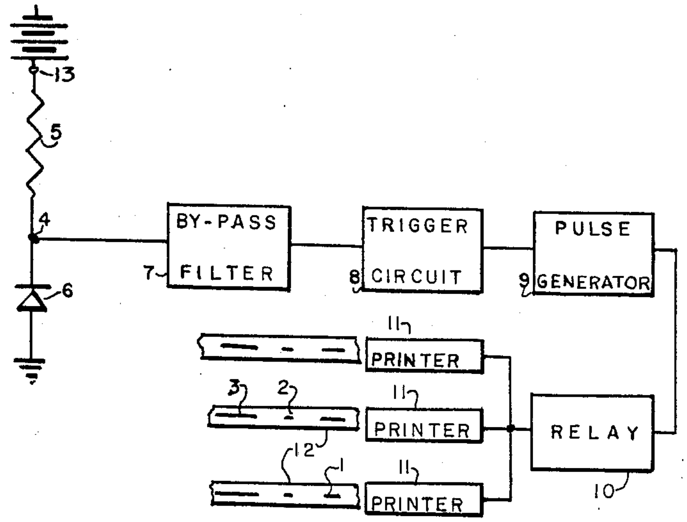
Fig. 1 is a block diagram illustrating a pulse generation apparatus utilized for producing fiducial markings on a plurality of records.

Referring to Fig. 1, a noise generator consists of a resistance 5 and a crystal diode 6, as for example, a selenium or germanium crystal, connected in series between a terminal 13 and ground. The diode is connected so that it presents its highest impedance in the direction from the terminal 13 toward ground. When a positive source of potential is connected to the terminal 13 the diode 6 operates as an efficient source of noise voltage, producing frequencies in a spectrum extending from pure D.C. to the megacycle range of frequencies.

The noise generator is connected from the terminal 4 to a band-pass filter 7 designed to pass a predetermined narrow band of frequencies from a predetermined portion of the frequency spectrum. In the present invention the band pass filter is constructed to enable the selection of any one of several bands of frequencies from the spectrum for passage therethrough.

Figure 2:
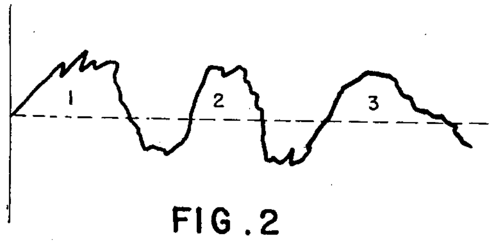
Fig. 2 is a curve showing the character of the variations of the voltage at the output of the noise generator.

The band-pass filter 7 is connected to a trigger circuit 8 which is designed to respond to a certain predetermined voltage and to be thereby triggered into its two stable conditions. As shown in Fig. 2 the voltage variations are plotted against time and appear as positive and negative portions with reference to the constant value represented by the dashed line. The trigger circuit would be triggered into one stable operating condition by a positive going voltage when it reaches the value represented by the dashed line, and would remain in that stable operating condition so long as the voltage remains greater than the constant value. On a negative going voltage, the trigger circuit would be triggered into its other stable condition, where it would remain during values of the noise voltage that are below the constant value represented by the dashed line.

The trigger circuit 8 is connected to the pulse generator 9 which is controlled by the trigger circuit 8 to produce a positive voltage pulse of constant amplitude during the interval that the trigger circuit is in one stable condition and no voltage output during the interval that the trigger circuit is in the other stable condition.

Figure 3:
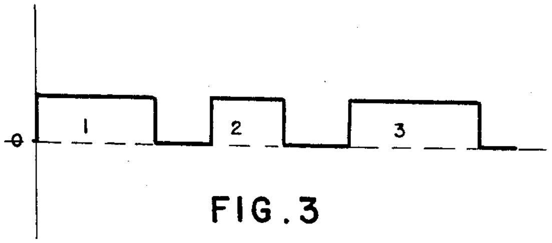
Fig. 3 is a curve showing the character of the voltage variations at the output of the pulse generator as a result of the variations shown in Fig. 2.

As represented by the disclosure of Fig. 3, the dashed line represents the zero voltage value and the square topped curves represent the voltage variations at the output of the pulse generator 9.

Fig. 1 further discloses a relay 10 connected to the output of the pulse generator 9 for controlling a plurality of circuits to separate printing devices 11 associated with recorders operating upon the tapes or sheets 12. The separate printers all operate simultaneously in response to the control of the relay 10 whereby marks having the same length and spacings are impressed upon the separate recording tapes or sheets. The marks 1, 2 and 3 correspond to the similarly indicated voltages shown in Figs. 2 and 3.

Figure 4:
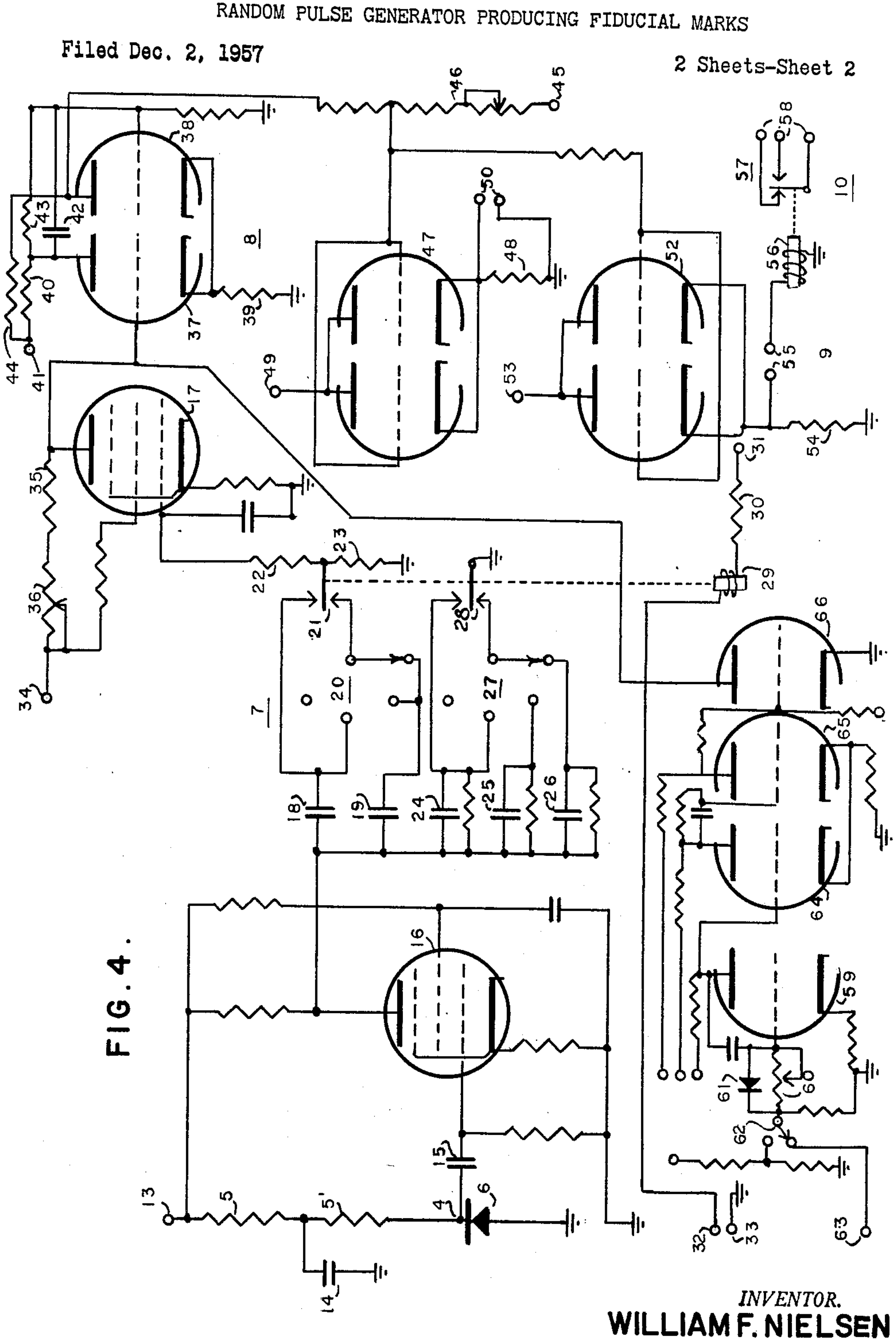
Fig. 4 is a more detailed circuit diagram of the random pulse generator in accordance with the present invention.

In Fig. 4 the noise generator comprises a pair of resistors 5 and 5′ connected in series with a selenium or germanium diode 6 between terminal 13 and ground. A source of potential may be connected between the terminal 13 and the ground, the positive pole of the source being connected to the terminal 13. Intermediate the resistors 5 and 5′ a connection is made to ground through a capacity 14. The diode 6 may be a 1N34 connected as shown in a way that it presents its maximum impedance to the flow of current from the terminal 13. When thus connected the diode passes approximately ½ ma., current in the direction of its minimum conductivity. The selenium or germanium diode 6 when so connected generates noise with a composite peak to peak amplitude of approximately 100 millivolts with a frequency spectrum extending from a pure D.C. to a megacycle range of frequencies.

The noise voltage of the diode 6 is capacitively coupled from the terminal 4 by the capacitor 15 to the grid of the pentode 16, used as an amplifier. The time constant of the coupling sets a finite lower limit to the amplified frequency spectrum. The amplifier 16 is considered to be a part of the noise generator.

The output from the pentode 16 is connected to a filter circuit shown at 7, which is arranged to provide for the selection of a portion of the total frequency spectrum of the noise generator for use in determining the randomness of the pulse duration and spacing. The desired frequency band may be selected from the amplified composite signal by changing the value of the coupling and shunt capacitors connecting the plate of the pentode 16 to the grid of the pentode 17. The coupling capacitors 18 and 19 are provided, each having one terminal connected to the plate of the pentode 16. The other terminal of the capacitors 18 and 19 are separately connected to the contacts of the selector switch 20. The movable element of the switch 20 is connected to one contact of the double throw switch 21, which in turn has a movable element connected to the grid of the pentode 17. The connection is made to the grid of the pentode 17 at a point between a pair of resistors 22 and 23, which are connected in series between the grid and ground. The other contact of the double throw switch 21 is connected to the other terminal of the capacitor 18. In one position of the double throw switch, the grid is connected through the capacitor which at the moment is connected through the selector switch. In the other position of the double throw switch the selector switch is effectively shunted and the connection between the plate of the pentode 16 and the grid of the pentode 17 is made through capacitor 18.

The plate of the pentode 16 is further connected to ground through capacitors shunted by resistors of which there are three. The shunt capacitors 24, 25, and 26 are each respectively shunted by resistors and have one terminal connected to the plate of the pentode 16. The other terminals of the capacitors 24, 25, and 26 are each connected to a separate contact of a selector switch 27. The movable element of the selector switch 27 is connected to one contact of a double throw switch 28. The movable element of the double throw switch 28 is connected to ground. The other contact of the double throw switch 28 is connected direct to the other terminal of the capacitor 24. The double throw switch in one position connects the capacitor, which at the moment is connected through the selector switch, to the ground connection. In the other position of the double throw switch 28 the selector switch 27 is bypassed and the capacitor 24 is connected to the ground connection.

The double throw switches 21 and 28 are ganged together by a connection with the relay 29, whereby the switches are simultaneously actuated into their two operating positions. The relay 29 has a solenoid connected in series with a resistor 30 to a source of potential connected to the terminal 31. The solenoid is further connected to the terminal 32 which with the terminal 33, connected to ground, provides a connection for an externally located switch by which the relay may be remotely controlled. When the relay is in the upper position the selector switches 20 and 27 are bypassed and the coupling between the pentode 16 and the pentode 17 is made through the coupling capacitor 18 and the shunt capacitor 24. When the relay is in the lower position the coupling is made through whichever capacitor that is connected through the medium of the selector switches 20 and 27. While there are only a small number of coupling and shunt capacitors shown, the invention is not so limited but may encompass any number of combinations of capacitors to obtain the desired range of frequencies most suitable for the use to which the apparatus is to be put. The selection of a portion of the total noise signal produces a reduction in the amplitude of the resulting signal. For this reason it is necessary to provide an additional stage of amplification as represented by the pentode 17. The pentode 17 has its plate connected through a pair of resistors 35 and 36 to the terminal 34 to which a source of potential may be connected. The resistor 36 is constructed so that its resistance may be varied for the purpose of altering the range of voltage variations effected by the pentode 17, in response to its input signal. The variation of the resistance also alters the ratio of the "on" time to the "off" time of the pulse generator.

The plate of the pentode 17 is directly connected to the grid of the "Schmitt" trigger circuit shown generally at 8. The "Schmitt" trigger circuit 8 consists of a double triode tube having a first portion 37 and a second portion 38. The cathodes of the portions are connected together through a resistor 39 to ground. The plate of the first portion 37 is connected through a resistor 40 to the terminal 41 to which may be connected a positive source of high potential. The plate of the first portion 37 is further connected through a coupling arrangement of a capacitor 42 and resistor 43 in parallel to the grid of the second portion 38. The plate of the second portion 38 is connected through a resistor 44 to the terminal 41 and through a potentiometer 46 to the terminal 45 to which may be connected a negative source of potential. The resistance of the potentiometer is made variable to permit the variation of the load impedance whereby the amplitude of the output of the trigger circuit may be varied within limits.

In the absence of a signal, the trigger circuit is biased by means of the potentiometer 35, 36 so that the second portion 38 is conductive. Variation of the resistance of the resistor 36 varies the bias on the grid of the first portion of the trigger 37. The output from the pentode 17 is fed to the grid of the portion 37 and triggers the circuit, producing at the plate of the second portion 38 a positive pulse. The duration of the pulse and the lapse of time between pulses is determined by the character of the noise voltages. The random character of the pulses depends upon the wave shape of the noise signal. The resistor 35 as heretofore stated may be varied to change the ratio of the "on" time to the "off" time. Also, the amplitude of the output of the trigger circuit 8 may be varied by adjustment of the potentiometer 46.

To obtain a low impedance output, the plate of the portion 38 is connected at a midportion of the potentiometer 46 to the control grids of the double triode tube 47 operating as a cathode follower. The plates and cathodes are connected together as shown so that the two portions operate in parallel. The plates are connected to the terminal 49 to which may be connected a source of positive potential. The cathodes are connected through a resistor 48 to ground. The output terminals 50 are connected to the ends of the resistor 48 and provide a connection through which the output of the pulse generator may be connected to an external circuit.

Similarly, the output of the trigger circuit 8 is connected to the grids of a second double triode tube 52, The plates and the cathodes of the double triode tube 52 are connected together so that the two portions operate in parallel. The plates are conencted to the terminal 53 to which may be connected a source of potential and the cathodes are connected through a resistor 54 to ground.

The output from across the resistor 54 is connected through the shorting terminals 55 to the solenoid of the relay 56. The relay 56 includes the contactor 57 operable between two positions and may be used for the control of a power circuit designed to carry a heavier current than could be passed through the triode tubes. The triodes so arranged constitute pulse generators either one of which may be used, or both of which may be used for performing several desirable operations.

The arrangement may further optionally include a gating means which may operate to control the grid bias of the trigger circuit 8. For this purpose a triode 59 has its grid connected to a potentiometer 60 shunted by a subminiature selenium diode 61. The other terminal of the potentiometer is connected to a selector switch 62 having two positions and contacts, one contact of which is connected to the terminal 63 through which external controlling voltages may be applied to the grid. The other contact is connected to an internal source of voltage represented by the potential divider connected between a terminal and ground to which a source of voltage may be connected.

The output of the triode 59 is applied to the grid of the "Schmitt" trigger circuit represented by the double triode tube having portions 64 and 65. The output from the "Schmitt" trigger circuit is applied to the grid of the triode 66 which may be a second portion of a double triode tube. The plate circuit of the triode 66 is connected to the grid of the first portion 37 of the "Schmitt" trigger circuit 8 and the cathode is connected to ground.

When the triode 66 is conductive the plate of the tube 17 is maintained at ground potential and no change of voltage can take place at the grid of the tube portion 37. During this state of conditions, the pulse generator is ineffective. When the conductivity of the triode is reduced to approximately zero a voltage change at the plate of the pentode 17 may then raise the potential of the grid of the tube portion 37 and the "Schmitt" trigger circuit 8 so that it becomes effective to provide random pulses.

The triode 59 is normally biased to cutoff but its plate is at 130 volts due to the grid condition in the triode 64. The triode 66 is normally biased to conducting and thus prevents the "Schmitt" trigger 8 from being triggered. A voltage applied at the gate input is integrated at the grid of the triode 59, the time constant of the integration being equal to RC, where R is the parallel combination of the potentiometer 60 and the back resistance of the diode 61, and C is the "Miller" capacitance of the triode 59. This integrated voltage causes the plate of the triode 59 and the grid of the triode 64 to fall exponentially from 130 to 100 volts. At approximately 115 volts, the "Schmitt" trigger action occurs, cutting off the conductivity of the triode 66 and rendering the pentode 17 effective to trigger the circuit 8.

When the voltage is removed from the input of the triode 59 the charge stored in the "Miller" capacitance of the triode is discharged through the forward resistance of the diode 61, returning the plate of the triode 59 to 130 volts and triggering the gate circuit off at 120 volts.

Because of the unilateral characteristics of the diode 61 the time delay between the removal of the gate input and the cessation of random pulses is very short compared to the time delay between the occurrence of a gate input and the start of the pulse generator 9. This insures that the pulse generator will be cut off at release, even though release tone may not be present to remove the gate input a few seconds before release occurs.

The pulse generator 9 is connected to a relay means 10 which controls the supply of energy to each of a plurality of printing devices 11 operating upon the recording means 12. The marks 1, 2 and 3 represent the fiducial marking corresponding to the pulses in Fig. 3 are produced in accordance with the duration and spacing of the pulses at the output of the generator 9. Other means than a relay 10 and printer 11 may be used with the pulse generator to produce fiducial marking.

The apparatus operates as follows. The output of the noise generator produces random variations in the voltage such as is illustrated in Fig. 2. The output from the noise generator is fed to the bandpass filter 7, wherein a voltage variation having a narrower band of frequencies is accepted and passed on to a triggering circuit 8. The triggering circuit 8 has two stable operating conditions and is triggered into the two positions by the input voltage reaching the predetermined amplitude for which the trigger circuit is adjusted. The trigger circuit produces positive pulses having a spacing and duration determined by the variation of the input voltage. The output of the trigger circuit controls the output of pulse generator 9, which in turn is used to control the relay and the fiducial marking device.

The present apparatus has an advantage over known devices of the same character in that the randomness of the fiducial marking is automatically produced and the pattern of the marking is non-repetitive in character.

Having described and shown my invention and the best mode of practicing the same, what I desire to secure by Letters Patent is set forth in the following claims:

1. Means for producing a plurality of series of fiducial marks, each series being identical to each of the other series and the marks forming a pattern that is random in character and non-repetitive comprising, means for producing a noise voltage extending over a wide band of frequencies, means connected to said noise voltage producing means for selectively passing a narrower band of frequencies from a predetermined portion of the spectrum, means controlled by the voltages within said narrower band of frequencies for producing pulses having random duration and spacing, and means including printing means connected to said last named means and operable in response to the length of the pulse and the spacing between pulses for simultaneously producing visible fiducial marks having characteristics proportional thereto upon a plurality of simultaneously produced records.

2. Means for producing a plurality of series of fiducial marks, each series being identical to each other series and the marks being random in length and spacing forming a pattern non-repetitive in character comprising, means to produce a voltage having random variations in amplitude and extending over a wide band of frequencies, filter means connected to said last named means to pass a narrower band of frequencies, a trigger circuit connected to said filter means and operable in response to voltage variations at the output of said filter means to produce pulses having duration and spacing controlled by the voltage variations between predetermined amplitudes, a pulse generator connected to said trigger circuit and operable in response thereto, and a printing means connected to said pulse generator and controlled thereby for simultaneously making visible fiducial marks on a plurality of simultaneously produced records.

References Cited in the file of this patent

UNITED STATES PATENTS

| | | |
|---|---|---|
| 2,406,024 | McCann | Aug. 20, 1946 |
| 2,406,046 | Swezey | Aug. 20, 1946 |
| 2,539,014 | Frantz | Jan. 23, 1951 |
| 2,588,413 | Roschke | Mar. 11, 1952 |
| 2,610,226 | Klaasse et al. | Sept. 9, 1952 |
| 2,656,407 | Herrick et al. | Oct. 20, 1953 |